US 8,396,262 B2

(12) United States Patent
Aisaka et al.

(10) Patent No.: US 8,396,262 B2
(45) Date of Patent: Mar. 12, 2013

(54) APPARATUS AND METHOD FOR FACE RECOGNITION AND COMPUTER PROGRAM

(75) Inventors: Kazuki Aisaka, Kanagawa (JP); Yoshihiro Murakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 963 days.

(21) Appl. No.: 12/049,744

(22) Filed: Mar. 17, 2008

(65) Prior Publication Data
US 2008/0247611 A1 Oct. 9, 2008

(30) Foreign Application Priority Data

Apr. 4, 2007 (JP) ................................. 2007-098086

(51) Int. Cl.
G06K 9/00 (2006.01)
H04N 5/225 (2006.01)
H04N 7/18 (2006.01)
G05B 19/00 (2006.01)

(52) U.S. Cl. ............ 382/118; 82/103; 82/181; 348/169; 348/152; 340/5.83

(58) Field of Classification Search .................. 382/118, 382/103, 181; 348/169, 152; 340/5.83
See application file for complete search history.

(56) References Cited

U.S. PATENT DOCUMENTS

| 5,629,988 A * | 5/1997 | Burt et al. ...................... 382/276 |
| 7,324,246 B2 * | 1/2008 | Enomoto ....................... 358/538 |
| 2001/0026632 A1 * | 10/2001 | Tamai ............................ 382/116 |
| 2003/0059092 A1 * | 3/2003 | Okubo et al. .................. 382/118 |
| 2008/0187172 A1 * | 8/2008 | Otsu et al. ..................... 382/103 |

FOREIGN PATENT DOCUMENTS

| CN | 1959701 A | 5/2007 |
| JP | 11-175730 | 7/1999 |
| JP | 2002-333652 | 11/2002 |
| JP | 2003-346158 | 12/2003 |
| JP | 2006-163452 | 6/2006 |

* cited by examiner

*Primary Examiner* — Kathleen Y Dulaney
(74) *Attorney, Agent, or Firm* — Oblon, Spivak, McClelland, Maier & Neustadt, L.L.P.

(57) ABSTRACT

Disclosed is a face recognition apparatus for previously registering a face image of a person, receiving a moving image in which face identification is intended to be performed, and performing face recognition in the received moving image. The apparatus includes the following elements. A face registration unit registers the face of a person as an image. A face detection unit detects a face in a frame of an input moving image. A face tracking unit tracks the detected face in frames of the input moving image. A face identification unit compares the detected face, which is being tracked by the face tracking unit, with the registered face registered in the face registration unit to identify the face. A stabilization unit stabilizes the result of face identification by the face identification unit.

8 Claims, 7 Drawing Sheets

APPARATUS AND METHOD FOR FACE RECOGNITION AND COMPUTER PROGRAM

CROSS REFERENCES TO RELATED APPLICATIONS

The present invention contains subject matter related to Japanese Patent Application JP 2007-098086 filed in the Japanese Patent Office on Apr. 4, 2007, the entire contents of which are incorporated herein by reference.

BACKGROUND OF THE INVENTION

1. Field of the Invention

The present invention relates to a face recognition apparatus and method and computer program for identifying a face included in a captured image and, in particular, to a face recognition apparatus and method and computer program for continuously performing face recognition in a moving image.

More particularly, the present invention relates to a face recognition apparatus and method and computer program for stably identifying the same person in the whole of a moving image and, in particular, to a face recognition apparatus and method and computer program for continuously identifying the same person under circumstances where the person's face moves up or down, or to the left or right, or the size of the face varies every frame.

2. Description of the Related Art

Face recognition technology is widely applicable to human-machine interfaces, e.g., an individual identification system and a sex determination system which impose no burden on users. Recent digital cameras have face recognition functions. Those cameras can identifies an object and perform various camera controls, such as automatic focusing, automatic exposure, and image quality adjustment, based on the result of identification.

Most related-art methods for face recognition perform face detection and identification using frames as still images. Typically, face recognition is performed using full-face images. Face identification is to determine whether a registered face image matches an input face image. The registered face image is preferably compared to the input face image showing a face with the same orientation and size as those in the registered face image. On the basis of the result of identification of an object, many captured images can be classified, organized, and associated with one another. One of possible applications of this technology is to assign levels of importance to respective persons in a captured image and control camerawork while locking focus and exposure on a main person assigned with the highest level of importance, or perform image processing, such as image quality adjustment, suitable for the main person.

Japanese Unexamined Patent Application Publication No. 2002-333652 discloses an imaging apparatus for previously recording information about features of an object, detecting a face in image data, detecting an object with features matching the predetermined features among the detected faces, and focusing on the detected object. This imaging apparatus records levels of importance in addition to information about features of objects. When a plurality of objects (persons) are present in captured image data, the imaging apparatus performs whether the features of an object match the predetermined features in order of decreasing importance.

Digital video cameras employing the above-described face recognition technology can similarly perform various camera controls, such as automatic focusing, automatic exposure, and image quality adjustment, on moving images and can also use information related to a specified person as information for video data management. Those digital video cameras can be applied to security systems for surveillance or reconnaissance on a person.

When face recognition is continuously performed in a moving image, the orientation of the face of an object or the size of the face may vary with the motion of the object. In other words, the object's face may move up or down, or to the left or right every frame or the size of the face may vary every frame. Accordingly, face identification every frame will probably lead to misidentification. For example, a person is erroneously identified as another person even though the same person is captured in a moving image. Alternatively, different persons are incorrectly identified as the same person. Furthermore, the effects of surrounding environment, including illumination and background, associated with the motion of a person produce a change in video image. The change causes noise in image recognition processing.

The results of face identification over the whole of a moving image include frames (or fields) in which a person can be correctly identified and frames (or fields) in which misidentification is performed. In many cases, the identity is not confirmed stably. When the result of face recognition differs from frame to frame in a moving image captured through, for example, a video camera, various camera controls, such as automatic focusing, automatic exposure, and image quality adjustment, are unstabilized.

Face recognition is broadly divided into two modes, i.e., a learning mode and a recognition mode. In the learning mode, the face of an object (person) is registered. In the recognition mode, a detected face is compared to the registered face to recognize the face, i.e., identify the person. However, if an old registered face is continuously used in a moving image stream, it becomes difficult to respond to a change in the orientation or size of a detected face caused by the motion of an object (person). Unfortunately, the probability of misidentification gradually increases.

SUMMARY OF THE INVENTION

It is desirable to provide an excellent face recognition apparatus and method and a computer program that are capable of continuously performing face recognition in a moving image.

Furthermore, it is desirable to provide an excellent face recognition apparatus and method and a computer program that are capable of stably identifying the same person in the whole of a moving image.

Furthermore, it is desirable to provide an excellent face recognition apparatus and method and a computer program that are capable of continuously identifying the same person under circumstances where the person's face moves up or down, or to the left or right, or the size of the face varies every frame.

The present invention is made in consideration of the above-described problems. An embodiment of the present invention provides a face recognition apparatus for previously registering a face image of a person, receiving a moving image in which face identification is intended to be performed, and performing face recognition in the received moving image. The apparatus includes the following elements. A face registration unit registers the face of a person as an image. A face detection unit detects a face in a frame of an input moving image. A face tracking unit tracks the detected face in frames of the input moving image. A face identification unit compares the detected face, which is being tracked by the face tracking unit, with the registered face registered in the face registration unit to identify the face. A stabilization unit stabilizes the result of face identification by the face identification unit.

Applying face recognition technology to a digital camera enables the camera to perform camera control, such as automatic focusing, automatic exposure, and image quality adjustment. In dealing with a moving image captured by a digital video camera, it is difficult to stably perform face identification in a plurality of frames (or fields).

For example, a tracking technique may be used to track a specific detected face included in a captured image and identify the detected face. However, the face of an object, e.g., a person may move up or down, or to the left or right every frame of a moving image, or the size of the face may vary every frame. Accordingly, face identification every frame will probably lead to misidentification. For example, a person is erroneously identified as another person even though the same person is captured in a moving image. Alternatively, different persons are incorrectly identified as the same person. In general, face identification is to determine whether a registered face image matches an input face image. The registered face image is preferably compared to the input face image showing a face with the same orientation and size as those in the registered face image.

According to the above-described embodiment of the present invention, when detecting a face in a frame of an input moving image, the face recognition apparatus fixes a tracking target to the detected face, i.e., locks tracking on the detected face and compares the detected face, which is being tracked, with the registered face to identify the face while performing tracking in the subsequent frames. The apparatus includes the stabilization unit for stabilizing the result of face identification by the face identification unit.

The stabilization unit may update the registered face, registered in the face registration unit, of the person whose face has been identified by the face identification unit to the present detected face of the person every predetermined frame period of the moving image. Advantageously, the results of face identification can be stabilized in a plurality of frames such that the result of face identification responds to a change in orientation or size of the detected face caused by the motion of the person (object).

The stabilization means may lock face identification on the detected face when the result of face identification on the detected face, which tracking by the face tracking unit is locked on, satisfies a predetermined reliability criterion. The reliability criterion for the result of face identification may include the number of times of successful face identification by the face identification unit or an accumulated value as a score upon face identification on the identified person. After that, the stabilization unit may update the registered face to the detected face that face identification is locked on.

A face which face identification is to be locked on, i.e., an identification target face corresponds to a face which tracking is newly locked on. The reason is as follows: When tracking lock on a detected face is unlocked during tracking, face identification lock thereon is also unlocked. Therefore, a face on which face identification is to be locked later corresponds to a face on which tracking is newly locked. When face identification lock is unlocked and face identification is again locked, it is obvious that a detected face which is being tracked from the preceding frame, i.e., the detected face on which tracking has been locked is different from a face on which face identification is again locked. Accordingly, the detected face on which tracking has been locked is removed from a target of face identification.

Before face identification is locked on a detected face, the stabilization unit may evaluate attribute information, e.g., the age or sex of the person subjected to face identification in addition to the number of successful face identification times or an accumulated value as a face identification score. The stabilization unit may determine on the basis of the result of evaluation whether face identification is locked on the detected face. Accordingly, a person who does not have to be subjected to face identification (or a person having low importance) can be removed from a target of registered-face updating.

Although the stabilization unit updates the registered face to a detected face on which face identification is being locked every predetermined frame period, the stabilization unit may update the registered face so long as a predetermined condition is satisfied, e.g., the accuracy of face identification on the detected face is sufficiently high. Consequently, the registered face can be prevented from being changed to an unfavorable detected face for face identification. The accuracy of face identification can be assured in the subsequent processing.

In this instance, whether the accuracy of face identification is high may be determined on the basis of, for example, the size of the detected face and at least one of the yaw angle and the pitch angle of the detected face.

Another embodiment of the present invention provides a computer program described in computer-readable form so as to allow a computer to execute a process for previously registering a face image of a person, receiving a moving image in which face identification is intended to be performed, and performing face recognition in the received moving image. The program includes the steps of (a) registering the face of a person as an image in a face registration unit, (b) detecting a face in a frame of an input moving image, (c) tracking the detected face in frames of the input moving image, (d) comparing the detected face, which is being tracked in the step (c), with the registered face registered in the face registration unit to identify the face, and (e) updating the registered face, registered in the face registration unit, of the person whose face has been identified in the step (d) to the present detected face of the person every predetermined frame period of the moving image to stabilize the result of face identification.

This embodiment of the present invention defines the computer program described in computer-readable form so as to allow a computer to execute the predetermined process. In other words, installing the computer program according to this embodiment of the present invention into a computer enables the computer to achieve cooperative operation, so that the same advantages as those of the face recognition apparatus according to the foregoing embodiment of the present invention can be obtained.

The embodiments of the present invention can provide an excellent face recognition apparatus and method and a computer program that are capable of continuously performing face recognition in a moving image.

Furthermore, the embodiments of the present invention can provide an excellent face recognition apparatus and method and a computer program that are capable of stably identifying the same person in the whole of a moving image.

Furthermore, the embodiments of the present invention can provide an excellent face recognition apparatus and method and a computer program that are capable of continuously identifying the same person under circumstances where the person's face moves up or down, or to the left or right, or the size of the face varies every frame.

Other features and advantages of the present invention will be apparent from the following detailed description of the preferred embodiments of the invention in conjunction with the accompanying drawings.

DESCRIPTION OF THE PREFERRED EMBODIMENTS

An embodiment of the present invention will be described in detail with reference to the drawings.

A face recognition system performs a face detection process of detecting a face region in an input image and a face identification process of identifying a face included in the detected face region. An input face image may include a human face or an animal face. The face detection process is to detect a human face in a given image (corresponding to one still image or one picture (field or frame) of a moving image) and obtain the location and size of the face. A plurality of faces may be present in one image. The face identification process is to identify a detected face, i.e., determine whether the detected face is the same as a previously registered face.

To perform face recognition, an image of a person to be identified is registered. Subsequently, the face detection process of detecting a face in an input image is performed and the face identification process of determining whether the detected face is the same as the registered face is then performed.

Figure 1:
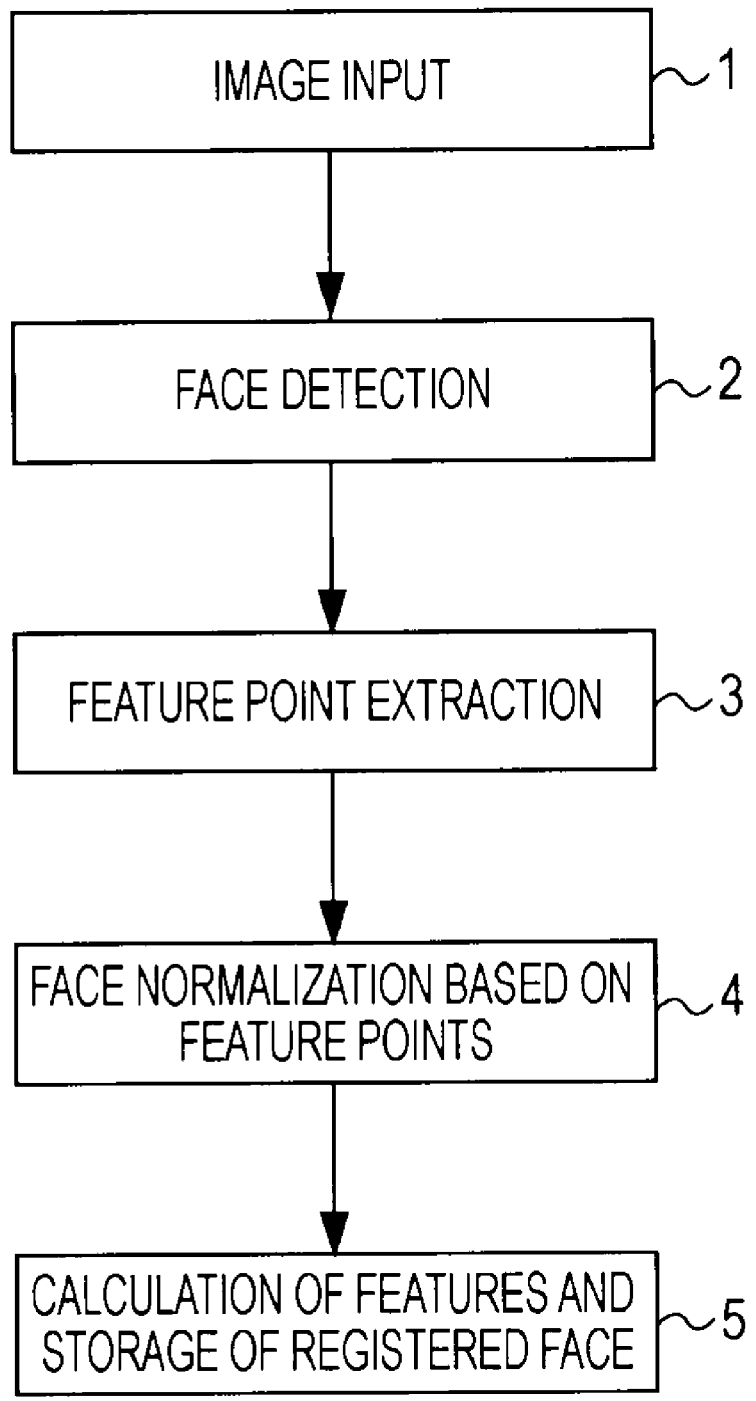
FIG. 1 schematically shows the flow of face registration.

Face registration corresponds to a learning mode, in which a process of learning recognition processing using learning images to generate recognizers used for face identification is carried out. FIG. 1 schematically shows the flow of face registration. Referring to FIG. 1, a face is detected in an input image including the face of a person to be identified. Subsequently, feature points are extracted from a region corresponding to the face. The face is normalized on the basis of the feature points. Features are calculated by recognizers. The face is stored as a registered face.

Face identification corresponds to a recognition mode, in which a process of recognizing an image using the recognizers generated in the above-described learning mode to determine whether the recognized image includes the registered face is carried out.

Figure 2:
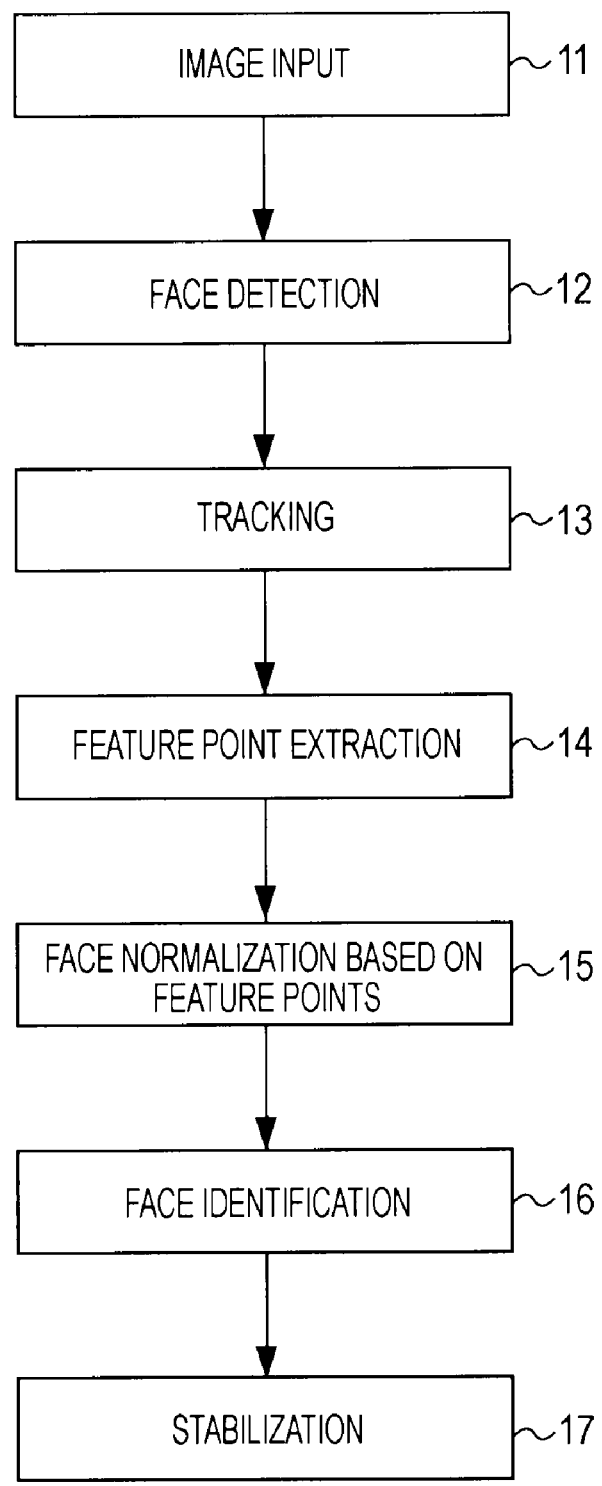
FIG. 2 schematically shows the flow of a face identification process of detecting a face in an input image and identifying the detected face as a registered face.

FIG. 2 schematically shows the flow of the face identification process of detecting a face in an input image and determining whether the detected face is identified as the registered face.

First, a face is detected in an input image. Subsequently, face tracking is performed so that the face of the same person can be continuously detected over the whole of an input moving image.

When a tracking target is fixed to a detected face, i.e., tracking is locked on the detected face, the same face ID is assigned to the same faces as the detected face in a plurality of frames (or fields). The detected face is continuously tracked until the tracking lock on the detected face is unlocked.

Subsequently, feature points are extracted from a region containing a detected face. The face is normalized on the basis of the extracted feature points to perform face identification. In this case, features of the detected face are compared with the registered features to perform face identification. The result of face identification is subjected to stabilization.

The term "stabilization" means a process of fixing a face identification target to a detected face, i.e., locking face identification on the detected face, on which tracking is being locked, of a person to be identified and updating a registered face of the person to the present detected face every predetermined frame (field) period to stabilize the results of face identification in a plurality of frames (fields) so that the result of face identification responds to a change in orientation or size of the detected face caused by the motion of the person (object). Before updating the registered face of the same person, whether a predetermined criterion is satisfied, e.g., whether the accuracy of face identification performed on the detected face at that time is sufficiently high is determined so that the accuracy of face identification is assured in the subsequent processing.

When the tracking lock is unlocked during tracking of the detected face, the face identification lock on the detected face is also unlocked. Accordingly, a face on which face identification is to be locked later corresponds to a face on which tracking is newly being locked.

According to the present embodiment of the present invention, the face detection process of detecting a face in a moving image employs a tracking technique and the face identification process involves stabilization. Consequently, the face of the same person can be continuously identified in a moving image in which the orientation or size of the person's face may often vary.

In the face recognition process according to the present embodiment of the present invention, tracking the face of the same person in a plurality of frames of a moving image is limited to a specific tracking technique. For example, an image processing method, disclosed in Japanese Unexamined Patent Application Publication No. 2006-031678, of detecting a representative face image in a sequence of images and tracking the face image can be used.

Figure 3:
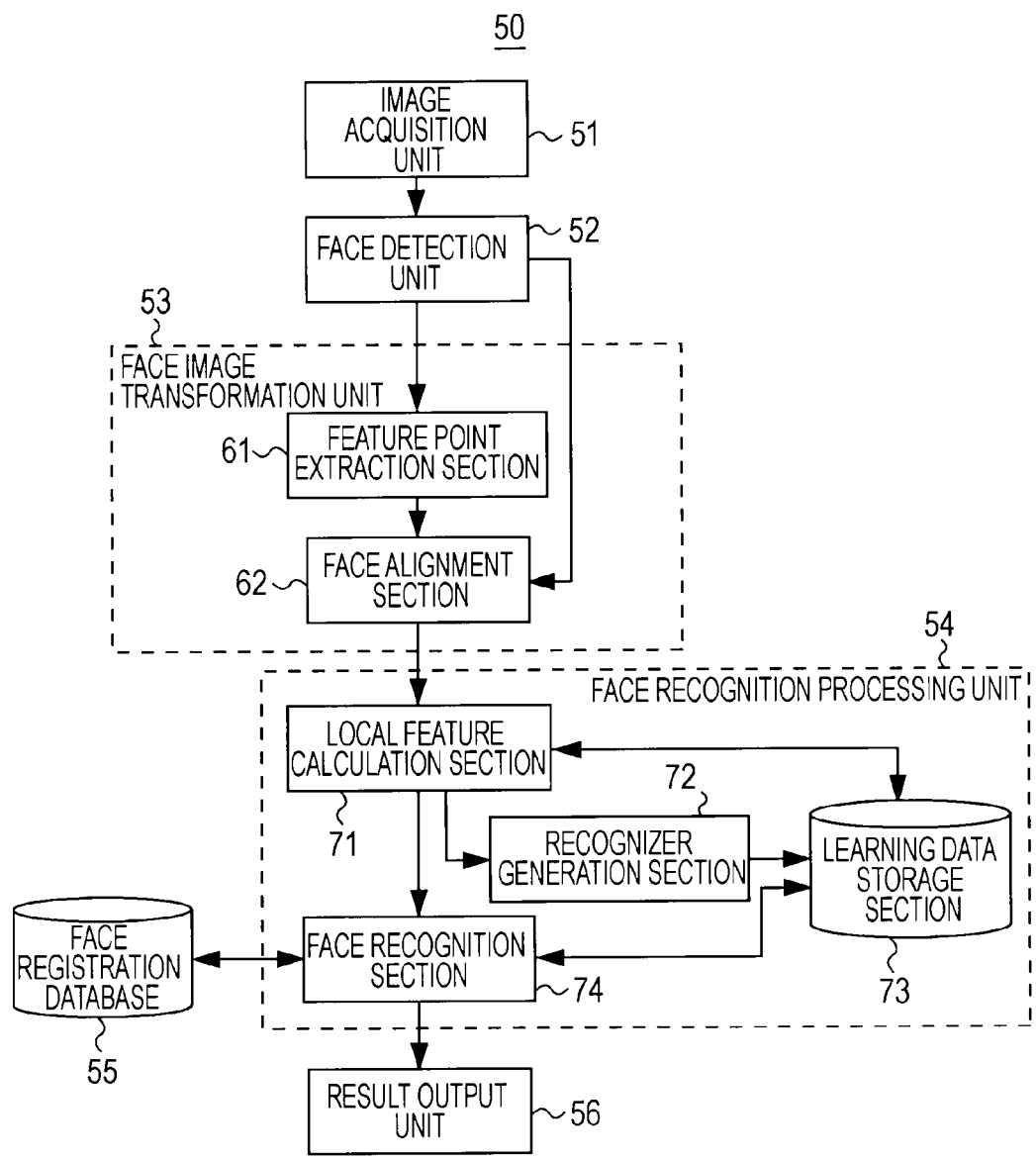
FIG. 3 is a diagram illustrating the functional structure of a face recognition system for performing face registration and face identification.

FIG. 3 illustrates the functional structure of a face recognition system for performing face registration and face identification. Referring to FIG. 3, the face recognition system, indicated at 50, includes an image acquisition unit 51, a face detection unit 52, a face image transformation unit 53, a face recognition processing unit 54, a face registration database 55, and a result output unit 56. The face recognition system 50 operates in either of two modes, i.e., a learning mode in which a face included in an input image is recognized and is then registered, and a recognition mode in which a face included in an input image is compared to each registered face to identify a person with the detected face. The learning mode involves a process of learning recognition processing using learning images to generate recognizers used for recognition processing in the recognition mode. The recognition mode involves a process of recognizing an image using the recognizers generated in the learning mode to determine whether the recognized image includes the face of a registered person.

When the face recognition system is mounted on, for example, a digital video camera, the image acquisition unit 51 acquires a captured image which has been subjected to signal processing. It is assumed that the acquired image includes at least the face of a person. In the learning mode, a plurality of learning images of a certain person are acquired from captured images so that the size or orientation of the face of that person differs from image to image. In addition, a plurality of images each of which does not include the face of the person are acquired. In the recognition mode, a captured image including the face of a person to be recognized is obtained. An image acquired by the image acquisition unit 51 is supplied to the face detection unit 52.

The face detection unit 52 analyzes an image supplied from the image acquisition unit 51 to extract a human face (the location and size of the face) from the image, thus detecting an image segment representing the extracted human face, i.e., a "face image segment". Although the images supplied from the image acquisition unit 51 each include the face of a person (or animal like a pet) to be recognized, not only the face but also the full body of an object may be included in some images. The face detection unit 52 determines a region corresponding to the face of a person in such an image and extracts a face image segment representing the face of the person. The detected face image segment is supplied to a feature point extraction section 61 and a face alignment section 62 in the face image transformation unit 53.

The face image transformation unit 53 includes the feature point extraction section 61 and the face alignment section 62.

The feature point extraction section 61 extracts feature points for alignment (hereinafter, "alignment feature points") from each face image segment supplied from the face detection unit 52, the alignment feature points being used in morphing by the face alignment section 62. The alignment feature points may be parts of a human face, such as the eyes, nose, and mouth, i.e., facial feature parts. The facial feature parts may be further divided into subparts. Not only facial feature parts but also subparts may be extracted as alignment feature points. Feature locations can be determined using, for example, a method called Active Appearance Models (AAM).

The face alignment section 62 analyzes a face image segment supplied from the face detection unit 52 and alignment feature points extracted from the face image segment by the feature point extraction section 61 to determine the orientation of a detected face, i.e., the angle of rotation of the detected face around each of the roll axis, the pitch axis, and the yaw axis. After that, the face alignment section 62 performs morphing, e.g., affine transformation so as to align facial feature locations with reference locations.

For example, a face image segment representing a face viewed from the front is subjected to morphing such that the right and left eyes are horizontally spaced a predetermined distance apart, the nose is located below the midpoint between the right and left eyes, and the mouth is positioned below the nose. When a detected face image segment supplied from the face detection unit 52 represents a face that does not face the front, the face image segment is transformed into an image substantially representing a face facing the front. In other words, even when a face image segment included in an image acquired by the image acquisition unit 51 represents a face that does not face the front, the face represented by the face image segment can be identified by the face recognition processing unit 54 arranged downstream of the face image transformation unit 53.

The tilt of a detected face around the roll axis can be corrected by shifting the eyes. On the other hand, when a detected face is rotated around the yaw axis, a face image segment representing the face has a small amount of facial information. Accordingly, the rotation of a face around the yaw axis significantly affects confidence in face identification. According to the present embodiment of the present invention, the angle of rotation of a detected face around each of the roll, pitch, and yaw axes is output as the result of face recognition. Those parameter values are used for stabilization, which will be described later, included in the face identification process on a moving image.

As described above, the face image transformation unit 53 extracts feature points from a detected face represented by a face image segment and transforms the face image segment so that the feature points are aligned with the respective reference locations, and supplies the resultant face image segment to the face recognition processing unit 54. The face recognition processing unit 54 includes a local feature calculation section 71, a recognizer generation section 72, a learning data storage section 73, and a face recognition section 74.

The local feature calculation section 71 calculates local features in a plurality of feature points of a supplied face image segment. The feature points used to obtain local features may be the same as or different from those of alignment feature points extracted by the feature point extraction section 61.

The local feature calculation section 71 includes Gabor filters, serving as a plurality of filters having different orientation selectivities and different frequency components to extract features of a face image segment. It is known that human visual cells include cells responsive to vertical lines and cells responsive to horizontal lines, i.e., cells with selectivity to specific orientation. The Gabor filters are spatial filters, serving as a plurality of filters each having orientation selectivity similar to the above, and are spatially expressed using a Gabor function in which a Gaussian function is used as a window function and a sine or cosine function is used as a base function for frequency response. The size of filter window is fixed to, for example, 24×24. Assuming that five different frequencies f and eight different angles θ are set, Gabor filters having 40 different orientation selectivities are constructed.

A Gabor filter operation is convolution of a pixel to which a Gabor filter is applied and a Gabor filter factor. A Gabor filter factor can be separated into real part in which the frequency response is a cosine function and imaginary part in which the frequency response is a sine function. The real and imaginary parts are subjected to convolution to obtain two components and the components are combined into a scalar value, serving as the result of Gabor filtering. The above-described operation is performed using a maximum of 40 different types of Gabor filters while changing the frequencies f and the angles θ, so that feature vectors, called "Gabor jets", serving as 40 scalar values at a maximum can be obtained. A Gabor jet is obtained as a local feature in each of feature extraction locations detected at regular intervals in the horizontal and vertical directions on face image data. A Gabor jet is characteristically unchanged even when a feature extraction location is shifted or deformed to a certain extent.

In the learning mode, the local feature calculation section 71 supplies a plurality of feature vectors having 40 or less parameter values in the respective feature points to the recognizer generation section 72. In the recognition mode, the local feature calculation section 71 calculates local features associated with the respective feature points on the basis of recognition features stored in the learning data storage section 73 and supplies the obtained local features to the face recognition section 74. Each recognition feature is information indicating which local feature (which portion of a Gabor filter) of which feature point is used in a recognizer generated by learning through the recognizer generation section 72. Consequently, recognizer generation and correlation coefficient calculation performed upon face recognition can be carried out in each feature point with respect to not only a correlation coefficient based on feature vectors with all dimensions but also a plurality of correlation coefficients including feature vectors with some of dimensions. In other words, a plurality of features with different dimensions can be used for learning and recognition.

In the learning mode, the recognizer generation section 72 performs a statistical learning process based on Adaboost using features of learning images calculated by the local feature calculation section 71 and learning model features previously held. In the recognition mode, the recognizer generation section 72 generates a recognizer used for recognition and stores the generated recognizer and information (correlation value and data indicating confidence in the recognizer) related to the recognizer into the learning data storage section 73. In addition, the recognizer generation section 72 extracts model features, which significantly affect the recognition of a target face image segment, during a learning process of the recognizer and supplies the extracted model features as recognition features, serving as information indicating which local feature (which rectangular region of a Gabor filter) of which feature point is used in the recognizer, to the learning data storage section 73 so as to allow the section 73 to store the supplied data.

Adaboost is a theory, proposed by Freund et al. (1996), in which a lot of "weak classifiers (also called weak learners) better than random guessing" are combined into a strong classifier. Recognizers generated by the recognizer generation section 72 correspond to "weak classifiers better than random guessing". Each recognizer is generated so that the recognizer weights recognition at which the preceding recognizer is not good. In recognition processing, the reliabilities are obtained from confidences in the respective weak recognizers and a majority decision is performed on the basis of the reliabilities.

The learning data storage section 73 stores the recognizers generated by the recognizer generation section 72, information blocks related to the respective recognizers, and recognition features.

In the recognition mode, the face recognition section 74 calculates a correlation coefficient between each of the features calculated by the local feature calculation section 71 and registered-face image data registered in the face registration database 55 using the recognizers stored in the learning data storage section 73 to determine whether a person with the detected face is identified as a registered person and then supplies the result of determination to the result output unit 56. Specifically, the face recognition section 74 determines whether the person with the detected face is identified as the registered person by a majority decision on the results of determination by the recognizers on the basis of the reliabilities of the recognizers stored in the learning data storage section 73.

The face registration database 55 registers information related to features necessary for recognition of a registered person. The face registration database 55 may register all of above-described Gabor jets at all of feature points in a face image segment representing the face of a registered person. The face registration database 55 may register at least information regarding features corresponding to recognition features.

The result output unit 56 outputs the result of determination supplied from the face recognition section 74. For example, when a registered face image matching a face image segment included in an input image is registered in the face registration database 55, information, for example, the name of a person related to the registered face image determined as the matching image is read from the face registration database 55. The information, such as the name, is output from the result output unit 56. According to the present embodiment of the present invention, when a moving image stream is input (i.e., acquired by the image acquisition unit 51) in the recognition mode, the result output unit 56 outputs face ID assigned to a detected face and other parameter values, e.g., the size of the detected face and confidence in face recognition every frame or at predetermined frame intervals.

Refer to Japanese Patent Application No. 2006-332302, assigned to the same assignee as this application, for detailed description on the face recognition system.

A major feature of a face recognition method according to an embodiment of the present invention is that the method includes a process (also referred to as stabilization) of stabilizing the results of face identification in a moving image stream. In this instance, stabilization is to continuously detect the face of the same person over the whole of a moving image stream by tracking the face of the person.

Figure 4:
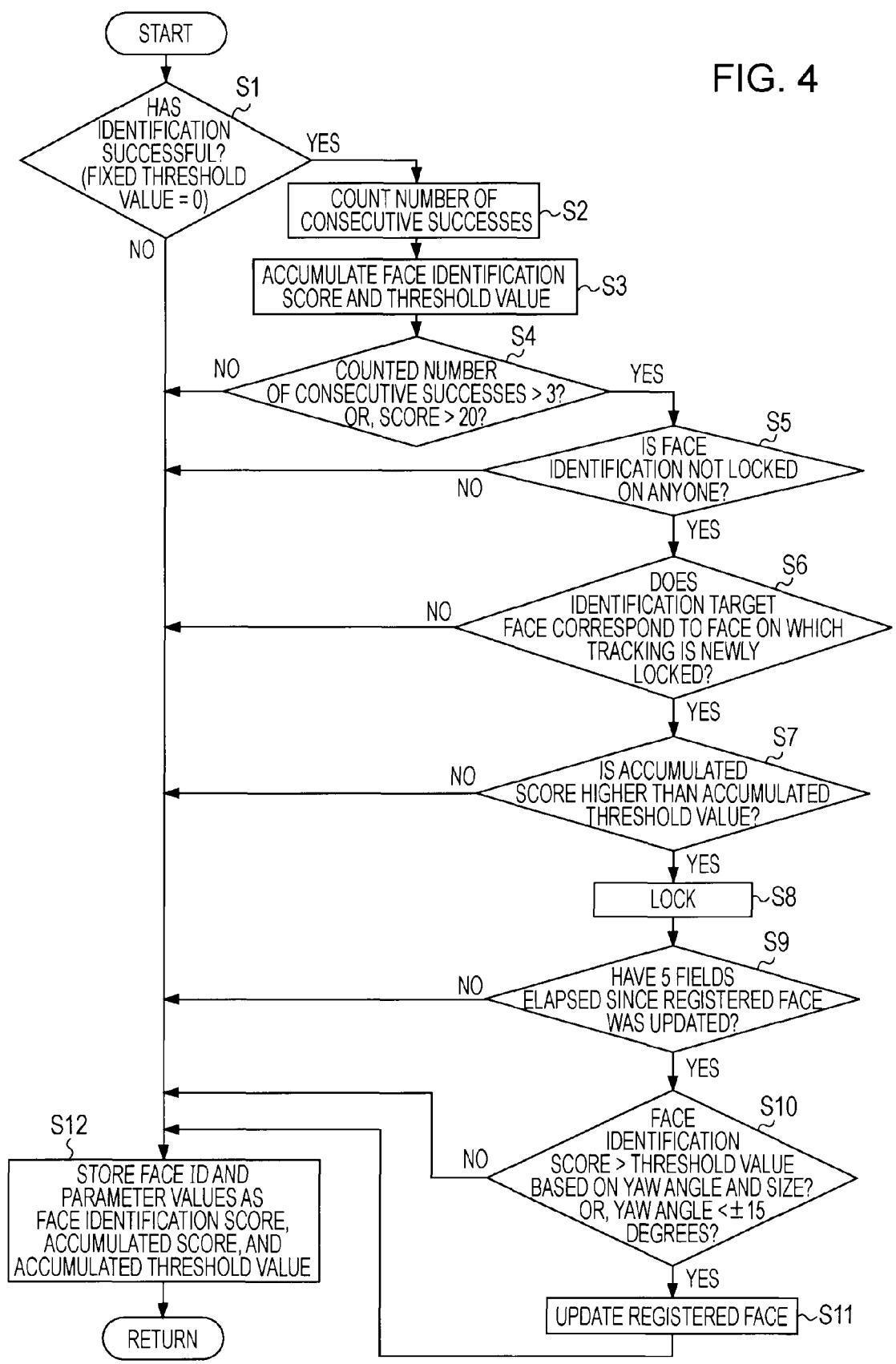
FIG. 4 is a flowchart of a process of stabilizing the result of face identification.

FIG. 4 is a flowchart of the process (stabilization) of stabilizing the result of face identification. In FIG. 4, numerical values, e.g., "0" representing a fixed threshold value, "3" representing the number of consecutive successes, "20" representing a score, "5 fields" representing updating time, and "±15" degrees representing a yaw angle are shown as examples.

In this process, the face recognition system 50 shown in FIG. 3 supplies, as results of face identification on a detected face which is being tracked in a moving image stream, the face ID of the detected face and other parameter values, e.g., the location of the face in a frame, the angle of rotation of the detected face around each of the roll, pitch, and yaw axes, the size of the detected face, and a parameter value indicating confidence in face recognition. The results of face identification are input every frame of the moving image stream or at predetermined frame intervals.

First, whether face identification in the face recognition system has been successful is determined using, for example, a fixed threshold value (step S1).

When it is determined that the face identification has been successful (YES in step S1), the number of consecutive times in which the face is successfully identified, i.e., the number of consecutive successes is counted (step S2).

Subsequently, a face identification score and a threshold value are accumulated (step S3). In this instance, the threshold value is dynamically controlled in accordance with, for example, the size of an input face image segment and at least one of a yaw angle and a pitch angle. This control will be described in detail later.

Figure 5:
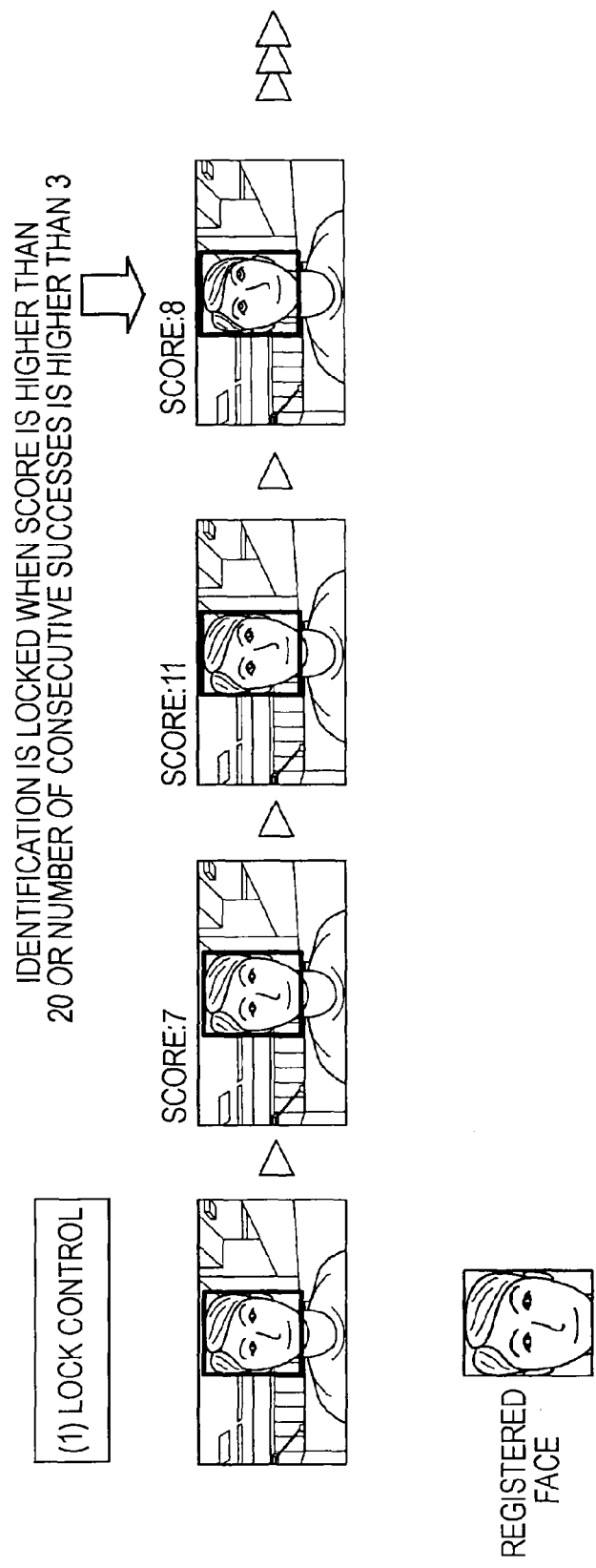
FIG. 5 is a diagram explaining a state in which face identification is locked on a certain registered face in accordance with tracking lock.

Whether the face of the same person is stably detected in the moving image stream by tracking the face is determined. Specifically, whether the number of consecutive successes exceeds a predetermined value (in this case, 3), alternatively, whether the face identification score is higher than a predetermined value (in this case, 20) is checked (step S4). FIG. 5 illustrates a state in which face identification is locked on a certain registered face in accordance with tracking lock on the face.

When it is determined that the detected face of the same person is stably detected by tracking the face (YES in step S4), whether face identification is not locked on anyone is determined (step S5). The reason is that it is assumed in the system according to the present embodiment that the number of registered persons is one. If a plurality of persons are registered, whether the number of persons on which face identification is locked is equal to or more than the number of registered persons is checked in step S5.

Furthermore, whether a face on which face identification is to be locked, i.e., an identification target face corresponds to a face on which tracking is newly locked is determined (step S6). The reason is as follows: When tracking lock on a detected face is unlocked during tracking of the face, face identification lock thereon is also unlocked as described above. Therefore, a face on which face identification is to be locked later corresponds to a face on which tracking is newly locked. When face identification lock is unlocked and face identification is again locked, it is obvious that a detected face which is being tracked from the preceding frame, i.e., the detected face on which tracking has been locked is different from a face on which face identification is again locked. Accordingly, the detected face on which tracking has been locked is removed from a target of face identification.

When the above-described condition is satisfied (YES in step S6), face identification is locked on the face to be identified (step S8), the face being registered as a tracking target face. After that, the registered face is tracked and identified until the tracking lock thereon is unlocked.

Alternatively, before face identification is locked on the face to be identified, an accumulated score may be compared to an accumulated threshold value so that face identification is locked only when the accumulated score is higher than the accumulated threshold value (step S7). Alternatively, the age or sex of the identified person or other attribute information regarding the person may be provided as additional conditions used to determine whether face identification is locked. Consequently, a person who does not have to be identified (or a person having low importance) can be removed from a target of face identification so that face identification is not locked on the person.

Furthermore, the registered face is updated at regular intervals (YES in step S9). According to the present embodiment of the present invention, face identification lock is unlocked every five fields and the registered face is tried to be updated to the present detected face of the identified person. In this instance, the time corresponding to "five fields" between updating the registered face means the fifth field after successful updating. If updating is failed, whether the registered face can be updated is checked every field.

If predetermined time has elapsed after successful updating, the registered face is updated so long as a predetermined condition is satisfied, e.g., the accuracy of face identification on a detected face at that time is sufficiently high. Specifically, a face identification score is compared to a calculated threshold value, which is controlled in accordance with the size and yaw angle of the detected face included in the present frame (field) (step S10). When the face identification score is higher than the threshold value (YES in step S10), the registered face is updated to the detected face (step S11).

As described above, the registered face of the identified person is updated to the present detected face every predetermined frame (field) period. Consequently, the results of face identification can be stabilized over a plurality of frames (fields) in accordance with a change in the orientation or size of a detected face caused by the motion of the object (person).

Figure 6:
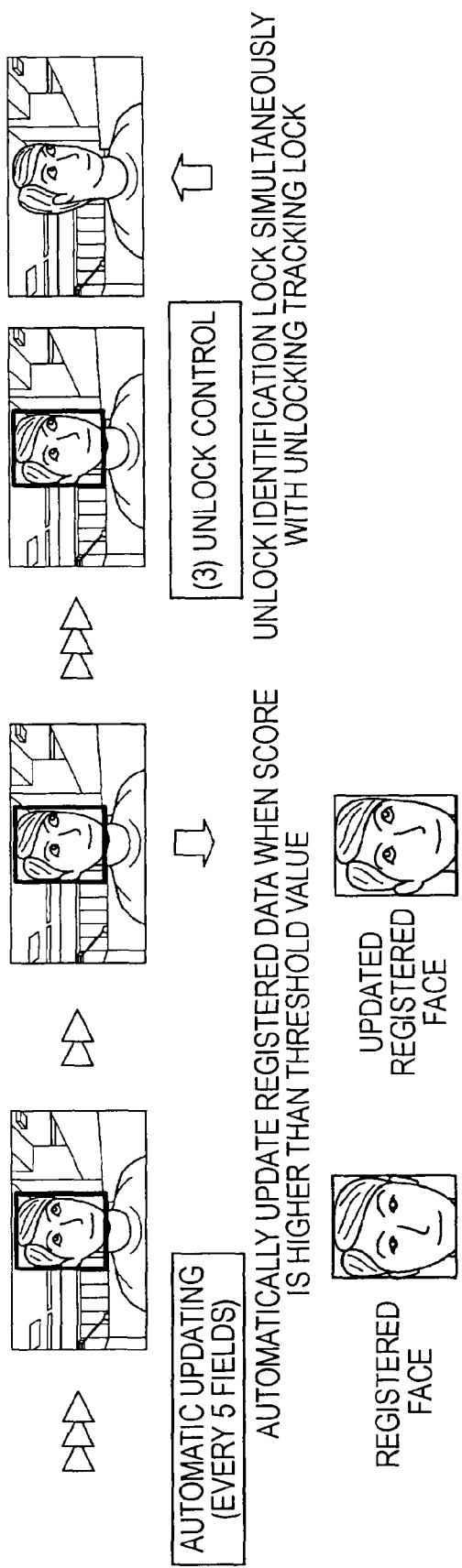
FIG. 6 is a diagram explaining a state in which the registered face of the same person as that in FIG. 5 is updated every predetermined field period.

FIG. 6 illustrates updating the registered face of the same person as that in FIG. 5 every predetermined field period.

Figure 7:
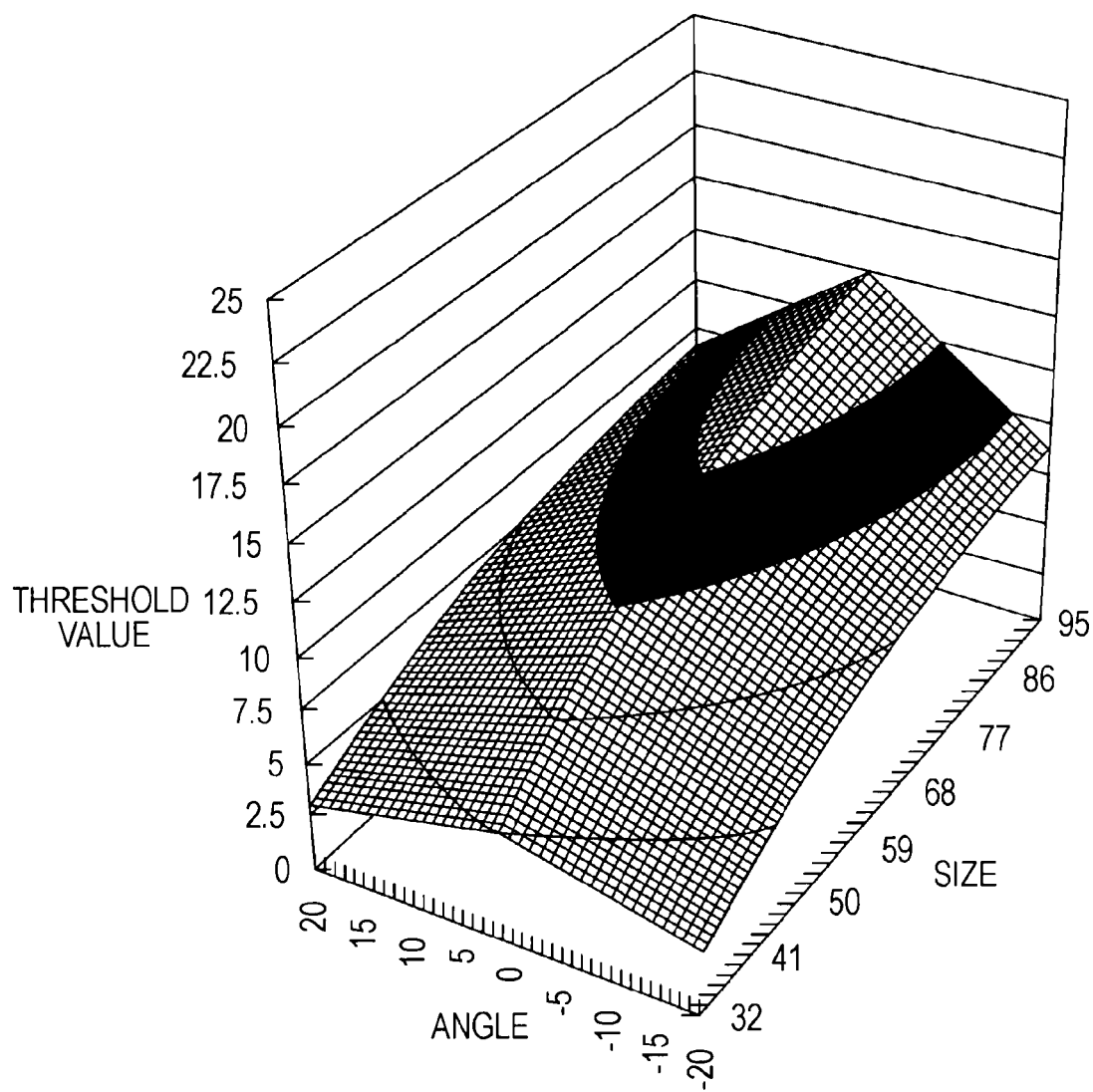
FIG. 7 shows an example of a threshold curve T for determining a threshold value T on the basis of the size and the yaw angle of a detected face.

The reason why a threshold value is controlled on the basis of the size and the yaw angle of a detected face is that the size and the yaw angle significantly affect the accuracy of face identification. FIG. 7 shows an example of a threshold curve T in which a threshold value T is determined on the basis of the size and the yaw angle of a detected face. The registered face is updated on the condition that the accuracy of face identification on a face detected at that time is sufficiently high. Accordingly, the accuracy of face identification can be assured in the subsequent processing.

Finally, the face ID of the detected face in the present frame and parameter values, e.g., a face identification score, an accumulated score, an accumulated threshold value are stored (step S11) for processing the next frame (field) irrespective of whether face identification is locked on the detected face in step S8.

In the present embodiment of the present invention, a threshold value is controlled on the basis of the size and yaw angle of an input (detected) face on the assumption that a face detector transmits information about the size of the input face and information about the yaw angle thereof. If the face detector transmits information about the pitch angle of the input face and other information, those information blocks may be used for threshold value control.

As for updating of the registered face in steps S10 and S11, a threshold value used for evaluating a face identification score of an input face may be fixed. In the present embodiment of the present invention, a threshold value is controlled in accordance with the size and yaw angle of a detected face as described above. The reason is that the accuracy of face identification depends on the size and yaw angle of the detected face. For example, the following two methods of controlling a threshold value are available.

(1) The size and yaw angle (and other information related to face identification) of each input face and the corresponding face identification score are previously measured in a test moving image. An approximate expression to obtain a change in face identification score depending on the size and yaw angle (and other information related to face identification) of an input image is calculated. For example, an approximate expression can be derived from the fact that a face identification score increases as the size of an input face increases and the fact that a face identification score decreases as the yaw angle increases.

(2) The approximate expression described in the above-described method (1) is used as an initial control expression. The size and yaw angle (and other information related to face identification) of an input face in an input moving image are simultaneously recorded. A threshold value is dynamically controlled while the approximate expression in the method (1) is being corrected.

It should be understood by those skilled in the art that various modifications, combinations, sub-combinations and alterations may occur depending on design requirements and other factors insofar as they are within the scope of the appended claims or the equivalents thereof.

What is claimed is:

1. A face recognition apparatus for previously registering a face image of a person, receiving a moving image in which face identification is intended to be performed, and performing face recognition in the received moving image, the apparatus comprising:

face registration means that registers the face of a person as an image;

face detection means that detects an image of the face in a frame of an input moving image;

face tracking means that tracks the detected image of the face in frames of the input moving image;

face identification means that compares the detected image of the face, which is being tracked by the face tracking means, with the registered face registered in the face registration means to identify the detected image of the face; and stabilization means that stabilizes a result of face identification by the face identification means, the stabilization means updating the registered face, registered in the face registration means, of the person whose face has been identified by the face identification means to a present detected image of the face of the person only once each predetermined frame period of the moving image, the predetermined frame period being equal to five frames.

2. The apparatus according to claim 1, wherein when the result of face identification on the detected image of the face, which tracking by the face tracking means is locked on, satisfies a predetermined reliability criterion, the stabilization means locks face identification on the detected image of the face and updates the registered face to the detected image of the face that face identification is locked on.

3. The apparatus according to claim 1, wherein the stabilization means updates the registered face to the detected image of the face so long as an accuracy of face identification on the detected image of the face is sufficiently high.

4. The apparatus according to claim 3, wherein when updating the registered face to the detected image of the face, the stabilization means determines, on a basis of a size of the detected image of the face and at least one of a yaw angle and a pitch angle of the detected image of the face, whether the accuracy of face identification is high.

5. A face recognition method for previously registering a face image of a person, receiving a moving image in which face identification is intended to be performed, and performing face recognition in the received moving image, the method comprising:

registering the face of a person as an image in a face registration unit;

detecting an image of the face in a frame of an input moving image;

tracking the detected image of the face in frames of the input moving image;

comparing the detected image of the face, which is being tracked in the tracking, with the registered face registered in the face registration unit to identify the detected image of the face; and updating, using a processor, the registered face, registered in the face registration unit, of the person whose face has been identified in the comparing to a present detected image of the face of the person only once each predetermined frame period of the moving image to stabilize a result of face identification, the predetermined frame period being equal to five frames.

6. A non-transitory computer readable medium encoded with a computer program described in computer-readable form so as to allow a computer to execute a method for previously registering a face image of a person, receiving a moving image in which face identification is intended to be performed, and performing face recognition in the received moving image, the method comprising:

registering the face of a person as an image in a face registration unit;

detecting an image of the face in a frame of an input moving image;

tracking the detected image of the face in frames of the input moving image;

comparing the detected image of the face, which is being tracked in the tracking, with the registered face registered in the face registration unit to identify the detected image of the face; and updating, using a processor, the registered face, registered in the face registration unit, of the person whose face has been identified in the comparing to a present detected image of the face of the person only once each predetermined frame period of the moving image to stabilize a result of face identification, the predetermined frame period being equal to five frames.

7. A face recognition apparatus for previously registering a face image of a person, receiving a moving image in which face identification is intended to be performed, and performing face recognition in the received moving image, the apparatus comprising:

a face registration unit that registers the face of a person as an image;

a face detection unit that detects an image of the face in a frame of an input moving image;

a face tracking unit that tracks the detected image of the face in frames of the input moving image;

a face identification unit that compares the detected image of the face, which is being tracked by the face tracking unit, with the registered face registered in the face registration unit to identify the image of the face; and a stabilization unit that stabilizes a result of face identification by the face identification unit, the stabilization unit updating the registered face, registered in the face registration unit, of the person whose face has been identified by the face identification unit to a present detected image of the face of the person only once each predetermined frame period of the moving image, the predetermined frame period being equal to five frames.

8. The apparatus according to claim 7, wherein the stabilization unit determines, on a basis of a size of the detected image of the face and at least one of a yaw angle and a pitch angle of the detected image of the face, a threshold that must be met for updating of the registered face.

* * * * *